United States Patent
Carlson et al.

(10) Patent No.: US 9,567,255 B2
(45) Date of Patent: Feb. 14, 2017

(54) LIGHT WEIGHT STRUCTURAL MATERIALS

(71) Applicant: EMPIRE TECHNOLOGY DEVELOPMENT LLC, Wilmington, DE (US)

(72) Inventors: William Brenden Carlson, Seattle, WA (US); Gregory D. Phelan, Cortland, NY (US); Vincenzo Casasanta, III, Woodinville, WA (US); Feng Wan, Issaquah, WA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 14/764,302

(22) PCT Filed: Jan. 31, 2013

(86) PCT No.: PCT/US2013/023996
§ 371 (c)(1),
(2) Date: Jul. 29, 2015

(87) PCT Pub. No.: WO2014/120172
PCT Pub. Date: Aug. 7, 2014

(65) Prior Publication Data
US 2015/0360995 A1    Dec. 17, 2015

(51) Int. Cl.
| | |
|---|---|
| *C03C 11/00* | (2006.01) |
| *C08K 7/22* | (2006.01) |
| *C04B 38/00* | (2006.01) |
| *C08F 110/02* | (2006.01) |
| *C08F 112/08* | (2006.01) |
| *C08F 120/14* | (2006.01) |
| *C08G 59/02* | (2006.01) |

(52) U.S. Cl.
CPC ......... *C03C 11/002* (2013.01); *C04B 38/009* (2013.01); *C08F 110/02* (2013.01); *C08F 112/08* (2013.01); *C08F 120/14* (2013.01); *C08G 59/02* (2013.01); *C08K 7/22* (2013.01); *C08L 2205/20* (2013.01); *Y10T 428/2982* (2015.01)

(58) Field of Classification Search
CPC ........ C08K 7/22; C03C 11/002; C08G 59/02; C08F 112/08; C08F 120/14; C08F 110/02; C04B 38/009; Y10T 428/2982

USPC .................................... 428/402, 403
See application file for complete search history.

(56) References Cited

U.S. PATENT DOCUMENTS

| | | | | |
|---|---|---|---|---|
| 4,303,736 A | * | 12/1981 | Torobin | B01J 13/22 126/709 |
| 6,254,981 B1 | | 7/2001 | Castle | |
| 2003/0198780 A1 | | 10/2003 | Campese et al. | |
| 2006/0258781 A1 | * | 11/2006 | Beach | C08K 7/20 523/223 |
| 2007/0104943 A1 | * | 5/2007 | D'Souza | C08K 7/26 428/317.9 |
| 2010/0051220 A1 | * | 3/2010 | Hong | B01J 13/14 162/138 |
| 2011/0124483 A1 | | 5/2011 | Shah et al. | |
| 2013/0071619 A1 | | 3/2013 | Kajikawa et al. | |

FOREIGN PATENT DOCUMENTS

| | | |
|---|---|---|
| CN | 101113183 A | 1/2008 |
| CN | 101305042 B | 5/2012 |
| KR | 20120125892 A | 11/2012 |
| TW | 201210799 A | 3/2012 |
| TW | 201249910 A | 12/2012 |
| WO | WO2011026572 A1 | 3/2011 |
| WO | WO2011075720 A1 | 6/2011 |

OTHER PUBLICATIONS

International Search Report for International Application No. PCT/US2013/023996 mailed Jun. 5, 2013.
3M™ Glass Bubbles Floated Product Series, 3M Energy and Advanced Materials Division, pp. 1-4 (Sep. 2008).
Plastics Industry: P-LITE Series, cenospheres.net, p. 1 (Apr. 2008).

* cited by examiner

*Primary Examiner* — Leszek Kiliman
(74) *Attorney, Agent, or Firm* — Pepper Hamilton LLP

(57) ABSTRACT

Functionalized microspheres for being dispersed in matrix materials to reduce the density and weight of the materials may be configured to include a covalently bound surface component which is configured to covalently bond with the matrix material so that when combined with the matrix material a strong, light-weight matrix material may be produced.

28 Claims, 2 Drawing Sheets

LIGHT WEIGHT STRUCTURAL MATERIALS

CROSS-REFERENCE TO RELATED APPLICATION

This application is a U.S. national stage filing under 35 U.S.C. §371 of International Application No. PCT/US2013/023996 filed Jan. 31, 2013 entitled "LIGHT WEIGHT STRUCTURAL MATERIALS," which is incorporated herein by reference in its entirety.

BACKGROUND

For most products which are to be handled and/or carried by consumers, the consumer typically prefers lighter weight products while not wanting to lose any product quality or durability. Lighter weight products, in addition to being more desirable for consumers, are often also preferred by manufactures in order to reduce shipping and handling costs. Essentially everything from raw materials and parts to finished products need to be shipped from their point of origin to the consumer.

Energy is required to move an object, whether that object is in a gravitational field or not. In a gravitational field an object has weight, and outside a gravitational field an object has mass. It takes fuel to move an object from a point A to a point B. Energy is required to accelerate the object to get it moving, and also to sustain the speed of movement according to the relationship mass times velocity squared. The energy needed to move an object may be expressed in terms of watts, where a watt is the ability to lift one kg one meter in one second against the force of gravity.

It also takes energy to hold an object against the force of gravity. Fuel is required to supply the energy. For vehicles, such as ships and trains, the fuel is typically a hydrocarbon mixture. For a human being or other animal, the fuel is glucose, and for a rocket, the fuel is often liquid oxygen and liquid hydrogen. The heavier the object the more fuel it takes to move the object. In addition, for the human body, the necessity of carrying around heavier objects may lead to added soreness in the shoulders and spine. Thus, there is a need for lighter weight objects that are essentially as strong and durable as the heavier objects that are being replaced.

Other issues may also arise from the selection of the types of materials used for product production. Electronic products are constantly being improved and upgraded, and environmental impacts can result from the large volumes of consumer electronic products that enter into and phase out of the market each year. Certain materials used to produce products for consumers and industries require manufacturing processes that are energy intensive and generate large amounts of greenhouse gas and environmental waste. In addition, many waste products end up in landfills, and the materials may persist in the environment for thousands of years.

Therefore, there is an increased need for ultra-lightweight materials that are not energy intensive to produce, and which are easy to recycle and preferably biodegradable, but significant technological needs remain unmet. New lightweight and ultra-lightweight materials are needed that are durable (i.e. impact-, crack-, rupture-, fatigue-, and corrosion-resistant), formable, transparent, non-toxic, inexpensive to fabricate, manufactured using low environment impact processes, and biodegradable. For certain applications, improved thermal conductivity, electrical conductivity, and optical transparency may also be relevant. Materials having reduced density/weight would be useful for applications in space, aerospace, vehicles, industrial products, consumer products, and everyday life in the human world.

SUMMARY

Presently disclosed are ultra-strong lightweight materials which incorporate hollow microspheres that have been treated in a manner that allows the spheres to be covalently bound within the material. The hollow microspheres reduce the density/weight of the product, while the covalent bonding between the spheres and the material provide a three dimensional bonded network to increase the structural integrity of the material. As an example, in an embodiment, ceramic microspheres may be functionalized by covalently bonding epoxy polymerizable groups to the microspheres, and a light weight epoxy product may be made by mixing the functionalized microspheres with an epoxy resin, followed by hardening of the resin so that the microspheres are covalently bound within the resin, take up a volume portion of the resin and thereby reduce the density/weight of the resin.

In an embodiment, functionalized hollow microspheres are provided for reducing the density of structural matrix materials. The microspheres include covalently bonded functional groups selected to covalently bond with the structural matrix material.

In an addition embodiment, a low-density material includes hollow microspheres covalently bonded with structural matrix material.

In a further embodiment, a method for producing a low density structural material includes intermixing hollow microspheres with a structural matrix material, wherein the hollow microspheres include a functional group selected to covalently bond with the structural matrix material, and covalently bonding the hollow microspheres with the structural matrix material.

DETAILED DESCRIPTION

Materials which have high strength, while also being lightweight, may provide many benefits and be advantageous in several ways. Such materials may reduce fuel costs since the objects weigh less and more can be shipped with a given amount of fuel. In addition, vehicles used to ship products may weigh less, and as such may carry more and requires less energy to propel. Thus, lighter weight materials may potentially have great benefits to the carbon footprint and the environment. Consumers generally prefer lighter weight objects that replace commonly used heavier objects, and often may equate a better quality feel to a lighter feel. Carrying lighter objects around may have less wear and tear on the body, and because of this, consumers may feel better and less stressed.

Microspheres may be used to reduce the density, and therefore also the weight of manufactured items by inclusion of the microspheres in the structural material of the item. The microspheres may be hollow, air-filled microspheres, or may contain a fill which has a lower density than the structural material into which they will be incorporated. Some low-density materials may include foams or other lattice type materials which are substantially air filled. For example, hollow microspheres may be used as additives in concrete to lighten the concrete and protect the rebar that reinforces the concrete. Concrete is very heavy and dense and for certain objects, such as oil platforms, it may be advantageous that the concrete be lightened to reduce the weight of the platform, make transport of the platforms more feasible, and enhance performance.

Figure 1A:
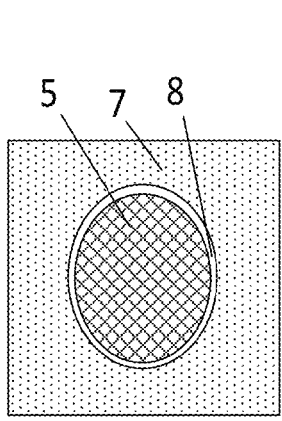
FIGS. 1A and 1B depict microspheres embedded in matrix materials according to an embodiment.
Figure 1B:
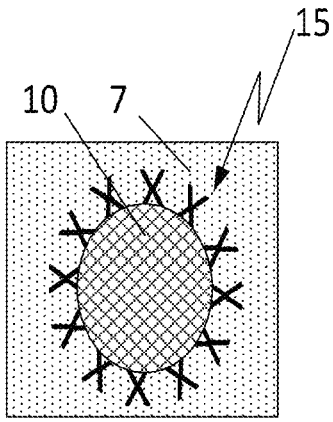
Figure 3:
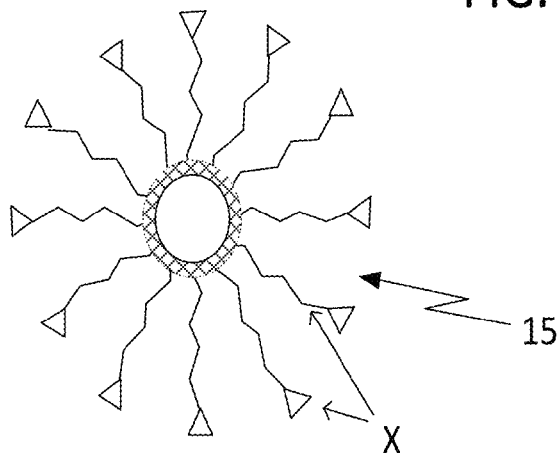
FIG. 3 shows a representation of a functionalized microsphere according to an embodiment.
Figure 4:
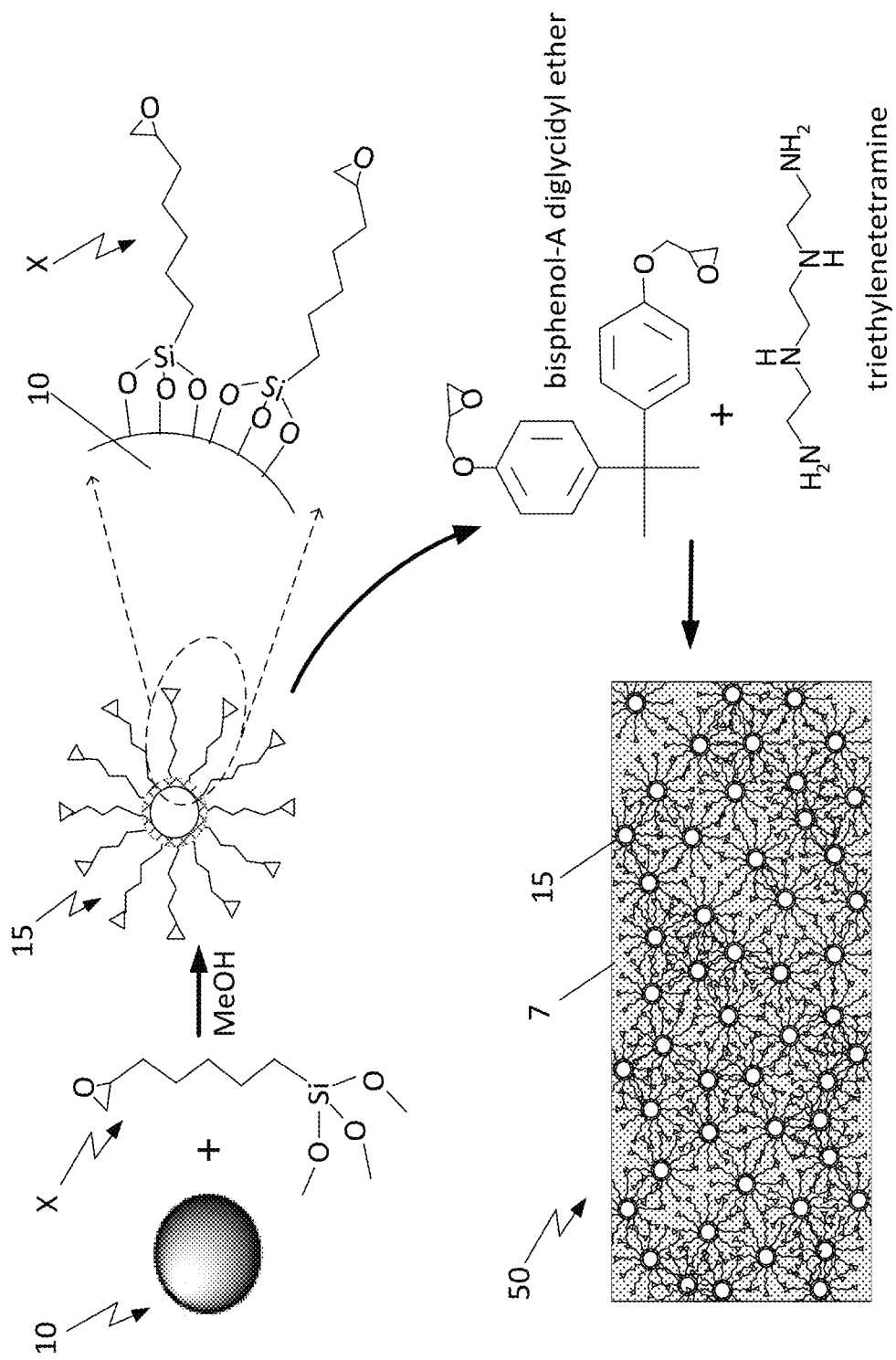
FIG. 4 is a schematic representation of a method for producing functionalized microspheres according to an embodiment.

If non-functionalized hollow microspheres 5 (in FIG. 1A) are simply mixed into material components 7, the spheres typically just blend in like a pigment and do not contribute to the overall structure. The spheres 5 are essentially only present within the material 7, and often when the material cures, dries, or hardens, the material may contract and pull away from the included spheres, leaving a small void space 8 between the hollow sphere and the surrounding media. This void space 8 may lead to a weakened structure for certain applications. However, as depicted in FIG. 1B, by covalently binding a functional compound X to the surface of a hollow sphere 10 to form functionalized spheres 15, such void spaces may be eliminated as the spheres may be covalently bound with the material 7 via the functional component. A more detailed embodiment of a functionalized sphere 15 is depicted in FIGS. 3 and 4.

Incorporation of functionalized hollow microspheres 15 into structural matrix materials may allow the creation of extremely strong yet lightweight structures. In an embodiment, lightweight, low-density materials may be made which include hollow microspheres that are covalently bonded with the structural matrix material to produce a three-dimensional structural network. As used herein, structural materials, or matrix materials, or structural matrix materials refer to any type of material which may be produced in a non-solidified form and which may then harden, or cure to form a structural component, or another solidified material.

Some examples of structural matrix materials that are used for producing a solidified material include, but are not limited to thermoplastic resins, thermoset resins, inorganic matrices, and cementitious matrices. For example, epoxy resins or polyethylene terephthalate are used to make plastic components, such as housing, containers, and covers etc. Some examples of thermoplastic resins may include, but are not limited to polyvinyl chloride, polyethylene, polypropylene, polyethylene terephthalate, acrylic resin, acetal resin, nylon, polytetrafluoroethylene, urethane, urea resin, carbonate resin, sulfone resin, cyclic resin, polybutylene terephthalate, other rigid engineering polymers, and any combinations thereof. Some examples of thermoset resins may include, but are not limited to polyester, vinylester, epoxy resin, acrylic resin, phenolic resin, sulfone resin, phenyl-formaldehyde, melamine, melamine-formaldehyde, other rigid thermoset engineering polymers, and any combinations thereof. Some examples of inorganic matrices may include, but are not limited to ceramic, glass, glass-ceramic, sol-gel compositions, and any combinations thereof. Some examples of cementitious matrices may include, but are not limited to portland cement, gypsum, polymer modified cement, latex modified cement, epoxy cements, other cementitious materials commonly used in the manufacture or repair of concrete structure, and any combinations thereof.

Figure 2:
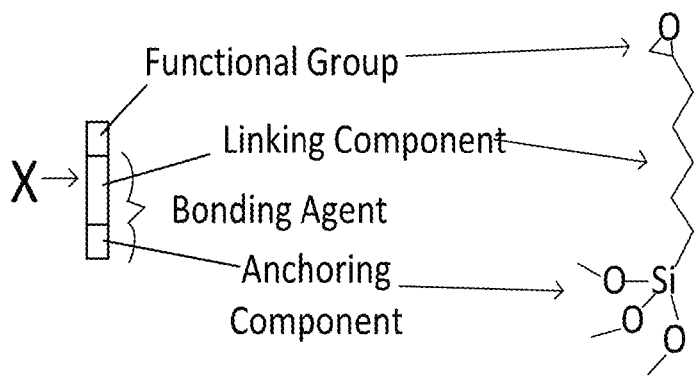
FIG. 2 depicts an example of functional components for a microsphere according to an embodiment.

Microspheres may be functionalized in accordance with the type of material into which they will be incorporated so that the microspheres include covalently bonded functional groups that are configured to covalently bond with the structural matrix material. When configured appropriately for a specific matrix material, functionalized spheres 15 may be incorporated into a very wide variety of different types of structural, or matrix materials 7. The functional compound X, an embodiment of which is depicted in FIG. 2, may be specifically configured to be able to polymerize with the matrix material 7 to form a continuous material network 50, as depicted in FIG. 4. The hollow spheres 10 may thereby be incorporated into the complete structural network 50 where the spheres may then contribute to the overall strength and physical nature of the network. The tightly interwoven network 50 may have distinct advantages when subjected to various stresses from temperature fluctuations, flexing, stretching, and/or impacting the network. Due to the added strength of the covalent network, the material will be able to take physical stresses that simple blended systems are unable to take.

Materials incorporating the covalently bound microspheres may have an increase in strength of at least about 5% as compared with materials which have non-covalently bound microspheres. The percent increase in strength may depend on the number of functional groups present on the microspheres, the types of functional groups, the strength of the covalent bonds being formed, and the percent volume of spheres incorporated into the material. For various embodiments, the increase in strength may be about 5% to about 10%. In other embodiments, the increase in strength may be about 10% to about 15%, or about 15% to about 20%, or may even be greater than about 20%. On a weight-for-weight basis, some materials incorporating the covalently bound microspheres may be at least about 35% stronger. In addition, further embodiments may be about 35% to about 40% stronger, or about 40% to about 50% stronger, or may even be greater than about 50% stronger.

The hollow microspheres 10 may be constructed from a variety of different materials. Some examples of the materials from which the hollow spheres may be constructed include, but are not limited to inorganic solids, such as ceramic, glass, metal, metalloids, and combinations thereof, carbon compositions (all allotropes), organic polymers, and plastics. Spheres of lighter weight materials, such as plastics, may provide a greater reduction in weight than microspheres of a heavier material, such as ceramics. Some examples of microspheres which may be functionalized in accordance with embodiments include the following microspheres manufactured by 3M™ of St. Paul, Minn.: Ceramic Microspheres: W-210 size 0.3-12 microns; W-410 size 0.3-24 microns; W-610 size 0.3-40 microns; W-273 size 1-9 microns; and Glass Bubbles: A16/500 density 0.16 grams per cubic centimeter, size 30-95 microns ($10^{th}$-$90^{th}$ percentiles); A20/1000 density 0.20 g/cc, size 25-60 microns ($10^{th}$-$90^{th}$ percentiles); D32/4500 density 0.34 g/cc, size 20-65 microns ($10^{th}$-$90^{th}$ percentiles); H50/10,000 EPX density 0.50 g/cc, 15-55 microns ($10^{th}$-$90^{th}$ percentiles). In addition, the microspheres may be hollow polyethylene microspheres of about 50 microns in diameter and about 5-10 microns wall thickness.

Functional compound X may be configured in accordance with the chemical nature of the matrix material 7 to covalently bond with the matrix material and form a structural network 50 as discussed above. For this purpose, functional compounds X may be configured to include at least a functional group, that may be organic or inorganic, and that is compatible with, and bondable with the matrix material 7. Some examples of functional groups may include, but are not limited to acrylates, methacrylates, ethacrylates, 2-phenyl acrylates, acrylamides, methacrylamides, cyanoacrylates, epoxies, oxetanes, vinyls, vinyl ethers, vinyl esters, vinyl amides, vinyl ketones, styrenes, styryls, isocyanates, uranyls, carboxyls, olefins, allyls, allyl ethers, allyl esters, allyl amines, allyl amides, ethynyls, propargyls, acryloyls, methacryloyls, maleic anhydride, maleic esters, maleimides, itaconates, silanes, siloxanes, silanols, titanates, thiols, phosphazines, titanium oxides, silicones, zirconium oxides, and any combinations thereof.

In an embodiment, as depicted in FIG. 2, in order to attach the functional group with the microspheres, a bonding agent may also be needed. Such a bonding agent may covalently bond with both the microsphere and the functional group to attach and retain the functional group with the microspheres. The bonding agent may have an anchoring component which is compatible with, and configured to chemically bind to the microspheres by covalent bonds. The covalent bonds with the surface of the hollow microspheres provide for continuity between the spheres, the functional compounds X, and the surrounding matrix material 7. As an example of the number of binding sites available, for microspheres of about 30 microns in diameter, the available surface area will be about 376800 $nm^2$ (surface area of a sphere is $4\pi r^2$, 1 micron=1000 nm). Thus, there may be about 376,800 functional units per sphere or $6.25 \times 10^{-19}$ mol.

Some examples of anchoring groups may include, but are not limited to alcohols; amines; thiols; thiosulphates; carboxylic acids; acid chlorides; esters; acetals; hemiacetals; aminals; hemiaminals; ketones; aldehydes; α-hydroxy ketones; α-halo ketones; epoxides; lactones; thiolactones; azalactones; isocyanate; thiocyanate; imines; imides such as succinimides and glutimides; imido esters; aziridines; imidates; oxazine; oxazoline; oxazinium; oxazolinium; chlorotriazines; chloropyrimidines; chloroquinoxalines; chlorobenzotriazoles; sulphonyl halides; siloxanes silanols; silanes; pyridyldithio derivatives; N-hydroxysuccinimide esters; activated vinyls and nonactivated vinyls including acrylonitriles; acrylic esters; methacrylic esters; crotonic acids; crotonic esters; cinnamic acids; cinnamic esters; styrenes; butadienes; vinyl ethers; vinyl ketones; maleic esters; maleimides; vinyl sulphones; hydrazines; phenyl glyoxal, and combinations thereof.

The bonding agent may also include a linking component disposed between and bonding the anchoring component and the functional group. The linking component may provide a spacer unit between the anchoring component and the polymerizable functional group. In addition, the linking component may be configured to aid in dispersing the microspheres in the matrix and any solvents or co-reactants which may be required in formation of the final desired material product. In this regard, the matrix material and solvents, etc., will have a polarity and a hydrogen bonding capacity, and the linking component may be selected or configured to at least one of: have a polarity compatible with the polarity of the matrix material, and hydrogen bond with the matrix material.

Some examples of linking components may include, but are not limited to a single bond, a spacer group, and combinations thereof, wherein the spacer group is one of siloxanes, silicones, silicates, esters, ethers, and carbon-based chains including linear, branched and cyclic, saturated and unsaturated $C_1$-$C_{50}$ carbon-based chains, and combinations thereof, wherein the carbon-based chain may be interrupted with at least one hetero atom chosen from sulphur, oxygen, nitrogen, silicon, phosphorus, and combinations thereof, and may comprise a substituent chosen from hydroxyl, amine, thiol, carbamate, ether, acid, ester, amide, cyano, ureido, and combinations thereof.

The functional components X, may be designed dependent on the matrix material being used and the type of hollow microspheres being used. An appropriate functional group may be selected that will bind with both the matrix material and the microsphere. Alternatively, an appropriate functional group may be selected that will bind with the matrix material, and an appropriate anchoring group may be selected that will bind with the microspheres. In some embodiments, the functional component may bind to the anchoring component. In some embodiments, a linking component may be necessary to join the functional component with the anchoring component. A linking component may be selected that is capable of being reacted with and bound to each of the selected functional group and anchoring component.

In an embodiment, in a first set of process steps, the linking component and the anchoring component may be reacted together to attach the linking component to the anchoring component. In a second set of process steps, the combined anchoring/linking compound may be reacted together with the functional group to attach the functional group to the anchoring/linking compound to produce the functional component X. To produce functionalized microspheres, in a third set of process steps, the microspheres may be reacted with the produced functional components X to attach the functional components to the microspheres via the anchoring component.

In an embodiment, the anchoring component may be trimethoxysilyl, the linking component may be pentyl, and the functional group may be an epoxy. In an embodiment, wherein the microspheres are ceramic, the resultant epoxy/pentyl/trimethoxysilyl functional component may be reacted with the ceramic microspheres to produce functionalized microspheres 15.

In embodiments wherein the microspheres may be ceramic or glass, for example, prior to surface functionalization preparation, the ceramic or glass hollow microspheres may be treated for about 1 hour in boiling piranha solution (about 3:1 concentrated $H_2SO_4$:$H_2O_2$). After this etching, the beads may be removed from the piranha bath, rinsed with high purity water (such as may be obtained using an Ultrapure Milli-Q Reagent Water System by Millipore) and dried in a stream of argon or nitrogen. When sufficiently dry, the beads may be modified by any of several different procedures, some of which are discussed below, depending on the desired functional groups to be added to the beads.

In embodiments wherein the microspheres may be polymeric, for example, polyolefins such as polyethylene or polypropylene, the microspheres may be plasma treated to place hydroxyl moieties on the surface of the spheres. The plasma treated microspheres may be exposed to methacrylic chloride to covalently bind a layer of methacrylate moieties to the surface of the polymeric microspheres. The modified polymeric microspheres may be polymerized into polymer networks such as polyolefins, acrylics, vinylics, and styrene. The plasma treated microspheres may also be treated with isocyanates for addition to polyurethane systems. In this manner, super strong light weight polymer composites may be made.

EXAMPLES

Example 1

Surface Modification with 3-methacryloxypropyltrimethoxysilane (Gelest)

Cleaned and dried hollow glass or ceramic microspheres are added to a reaction kettle equipped with a mechanical stirrer and immersed in about 2% (w/w) 3-methacryloxypropyltrimethoxysilane in anhydrous toluene (Aldrich) for about 24 hours with agitation. The hollow glass or ceramic microspheres are filtered and rinsed, for example, with at least the following, or any similar wash sequence: 2 washes with anhydrous toluene, a wash with deionized water, and then a wash with ethanol to remove any physisorbed 3-methacryloxypropyltrimethoxysilane. The hollow glass or ceramic microspheres may be dried in a nitrogen or argon atmosphere. Resulting coverage may be approximately one 3-methacryloxypropyltrimethoxysilane/$nm^2$ of surface area.

Example 2

Surface Modification with (6-aminohexyl)-triethoxysilane (Gelest)

Cleaned and dried hollow glass or ceramic microspheres are added to a reaction kettle equipped with a mechanical stirrer and immersed in about 2% (w/w) (6-aminohexyl)-triethoxysilane in anhydrous toluene (Aldrich) for about 24 hours with agitation. The hollow glass or ceramic microspheres are filtered and rinsed, for example, with at least the following, or any similar wash sequence: 2 washes with anhydrous toluene, a wash with deionized water, and then a wash with ethanol to remove any physisorbed (6-aminohexyl)-triethoxysilane. The hollow glass or ceramic microspheres are dried in a nitrogen or argon atmosphere. Resulting coverage is roughly one (6-aminohexyl)-triethoxysilane/$nm^2$ of surface area.

Example 3

Surface Modification with (3-glycidyloxypropyl)trimethoxysilane (Aldrich)

Cleaned and dried hollow glass or ceramic microspheres are added to a reaction kettle equipped with a mechanical stirrer and immersed in about 2% (w/w) (3-glycidyloxypropyl)trimethoxysilane in anhydrous toluene (Aldrich) for about 24 hours with agitation. The hollow glass or ceramic microspheres are filtered and rinsed, for example, with at least the following, or any similar wash sequence: 2 washes with anhydrous toluene, a wash with deionized water, and then a wash with ethanol to remove any physisorbed (3-glycidyloxypropyl)trimethoxysilane. The hollow glass or ceramic microspheres are dried in a nitrogen or argon atmosphere. Resulting coverage is roughly one (3-glycidyloxypropyl) trimethoxysilane/$nm^2$ of surface area (FIG. 4).

Example 4

Methacrylate Modified Polyethylene Microspheres

An 8% solution of polyethylene in molten naphthalene is atomized using a commercial paint sprayer. The atomized spheres are collected and the naphthalene slowly sublimed at 50° C. yielding hollow spheres of polyethylene. The hollow polyethylene spheres will be roughly 50 microns in diameter with a wall thickness of 5-10 microns.

The polyethylene spheres are treated by an oxygen plasma. A gaseous flow ($N_2$ or $N_2+O_2$) is created by a continuous pumping (33 $m^3$/h), and excited by an electrodeless discharge by means of a microwave generator (2450 MHz) which delivers an incident power up to 1.5 kW. The discharge is produced in a quartz tube (32-mm diameter) connected to the fluidized bed reactor through a 90° elbow. This reactor is constituted of a vertical cylindrical Pyrex glass tube (height: h—about 1 m; inner diameter: D—about 0.15 m) with a porous plate at the bottom to support the polyethylene hollow microsphere bed. This plate has to be made with a material that does not destroy the reactive species of the plasma.

The reactor is filled with polyethylene microspheres and the gas feed ($N_2$ or $N_2+O_2$) is injected. For low flow rates, the polyethylene spheres do not move. When the flow increases, the powder starts to be fluidized and when the pressure counterbalances the weight of the bed, fluidization is initiated. The fluidization of the polyethylene spheres in the reactor occurs for gas flow values equal or above about 0.35 Nl/min (for pressure equal or above about 1.9 mbar). For flow values higher than about 1.9 Nl/min, there was entrainment of the particles. Prior to plasma treatment, the powder was fluidized by the 0.35 Nl/min flow for 5 min.

The plasma treated hollow microspheres of polyethylene (25 g) are then added to a mixture (4:1) of anhydrous toluene and triethylamine, 100 mL, at 0° C. and stirred under an argon atmosphere. Using an addition funnel, methacrylic acid chloride (Aldrich, 5.0 g) is added dropwise to the polyethylene microspheres over a period of 25 minutes. The solution is allowed to stir for three hours and the resulting modified spheres are filtered from solution. The spheres are washed with the mixture of toluene and triethylamine (3×100 mL) followed by washing with water (3×100 mL). The spheres are then allowed to dry.

Functionalized microspheres 15 having various alternative combinations of the components as discussed above may be prepared by a manufacturer and retained in bulk for retail to consumers. A consumer may then purchase premade bulk microspheres for designated purposes, or a consumer may possibly order a specifically designed microsphere to be made for their unique purposes. Alternatively, a product manufacturer may provide components in a kit form and include process steps for designing functionalized microspheres as needed on site, allowing a consumer to produce their own functionalized microspheres as needed.

Low-density materials of structural network 50 may be designed and constructed by selecting appropriate combinations of the various components as discussed above, including type of matrix material 7, type of microsphere 10, and configuration of the structural compound X, including the functional component, and, if necessary, the anchoring component, and the linking component. The density of the matrix material may thereby be reduced with the incorporation of functionalized microspheres dispersed throughout the material. Because of the covalent bonding and the structural network which results, up to about 80% by weight of the material may be functionalized microspheres, and the material may remain sufficiently durable to withstand physical stresses, such as impacts, cracking, rupturing, fatigue, and corrosion. In embodiments, low-density materials may have various alternative amounts of functionalized microspheres, such as for example, 5% by weight, 10% by weight, 15% by weight, 20% by weight, 25% by weight, 30% by weight, 35% by weight, 40% by weight, 45% by weight, 50% by weight, 55% by weight, 60% by weight, 65% by weight, 70% by weight, 75% by weight, or 80% by weight, or any amount between any of the listed values.

Low-density structural materials may be made by selecting an appropriate structural matrix material for the product, and intermixing appropriate functionalized hollow microspheres with the matrix material, wherein the microspheres include at least one functional group selected to covalently bond with the structural matrix material. The mixture may then be processed or formed into a desired shape while allowing the hollow microspheres to covalently bond with the matrix material. For matrix materials, such as polymers, the polymers may be heated to a temperature above the melting temperature of the polymer and appropriately functionalized microspheres may be mixed into the polymer melt to bind with the polymer. The melt may then be injection molded, or extruded, for example, into a desired shaped product, and allowed to cool to produce a resultant material of a reduced weight. For epoxies, appropriately functionalized microspheres may be mixed with a fluid epoxy prior to addition of the hardener. The hardener may then be thoroughly mixed in and the mixture shaped by molding, extrusion or casting, for example, and allowed to harden into a desired end product. Other types of shaping, molding, or forming processes may also be used, such as, for example, rolling of fluid materials into sheets, to produce finished reduced weight products.

In an embodiment, microspheres for low-density materials may be functionalized by covalently bonding a bonding agent comprising the functional group to microspheres 10 to produce desired functional microspheres 15. The bonding agent may be configured to include an anchor portion for covalently bonding to the microspheres, and the functional group for covalently bonding with the matrix material. Functionalizing may further include covalently bonding the anchor portion of the bonding agent to the microspheres. The configuring of the bonding agent may also include configuring the bonding agent to include a linking group which covalently bonds the anchor group with the functional group, and the linking group may be chosen to be a component which is dispersible in the matrix material, either due to polarity, or via hydrogen bonding. Selected constituents may be chosen from any of the lists as previously provided, or from any other components, analogs or derivatives which may provide for a structural network of covalently bound microspheres as described herein.

In an embodiment of a low-density material wherein the matrix material is an epoxy, the polymerizable functional group may be at least one of: an epoxide, an amide, and an amino; the microsphere may be a ceramic microsphere, the anchoring group may be trimethoxysilyl, and the linking component may be at least one of: pentyl, propyl, hexyl, and steryl. For an epoxy matrix material, the epoxy may be bisphenol-A diglycidyl ether epoxy with an amine hardener. An amine hardener may be at least one of: ethylene diamine, triethylenetetramine, and a poly(amide).

In an embodiment of a low-density material wherein the matrix material may be polyethylene, the polymerizable functional group may be at least one of an olefin and a vinyl.

In an embodiment of a low-density material wherein the matrix material may be acrylic (poly(methyl methacrylate)), the polymerizable functional group may be at least one of a methacrylate and a vinyl.

In an embodiment of a low-density material wherein the matrix material may be glass, the polymerizable functional group may be triethoxy silane.

Example 5

General Functionalized Microspheres for an Epoxy Resin

Epoxies are common structural components which have a wide variety of uses. With reference to FIG. 4, functionalized microspheres for reducing the density/weight of an epoxy resin are formed from ceramic microspheres 10 functionalized to include epoxy polymerizable groups covalently bonded to the surface thereof. Functional compound X has an epoxy polymerizable group as the functional group, a pentyl chain as the linking component, and a silane tripod covalently bonded to the microsphere for anchoring the compound X to the microsphere.

Example 6

A Low-Density Epoxy Resin Kit

A light weight, yet very strong epoxy may be made which uses the functionalized microspheres of Example 1. The components for producing the final epoxy product may be provided in a kit form, which may include, a first epoxy component of bisphenol-A diglycidyl ether epoxy, the functionalized microspheres of Example 1, and a second epoxy component of triethylenetetramine hardener. The components may be provided in amounts which require no additional measuring, wherein the components maybe mixed together in the quantities provided. Or alternatively, proper ratios of portions of the components may be combined for smaller batches.

Example 7

A Light-Weight Epoxy Housing

A variety of products from electric components, housings and containers, to jet aircraft include components which are formed from epoxy resins, and there remains a desire for many of these products to be lighter in weight and stronger. A light weight, yet very strong epoxy housing will be produced from the kit of Example 6.

Essentially equal parts of the first epoxy component (epoxy a functionalized microspheres) and the second epoxy component will be mixed with an amount of the functionalized microspheres to produce a mixture of about 40 wt % microspheres, to produce an uncured epoxy matrix material. The uncured matrix material will be injected into a mold to form a rectangular box-shaped housing component, and the ingredients will be allowed to copolymerize and cure to a solid resin that is extremely strong, but light in weight, wherein the hollow microspheres essentially will be part of the epoxy matrix.

Example 8

Method for Producing a Low-Density Epoxy Resin

A liquid epoxy resin (about 20 g, Dow 335, epoxy equivalent weight about 200) is mixed with about 10 g of glass hollow microspheres functionalized with (6-aminohexyl)-triethoxysilane under vacuum to prevent entrapment of air bubbles. The two components are blended together for about 20 minutes under low shear. The blend is heated to about 90° C. and liquid 4,4'-methylenedianiline (about 9.5 g, amine equivalent weight about 99) is added and blended in.

The resultant mixture is suitable for forming (casting, molding, etc.) into a desired shape, and will cure to a solid mass having a measured density of about 1.03 g/cc.

Example 9

Method for Producing a Low-Density Epoxy Product

A mold is packed with glass hollow microspheres functionalized with (6-aminohexyl)-triethoxysilane and evacuated. Liquid epoxy resin (about 20 g, Dow 335, epoxy equivalent weight about 200) is blended with a polyamide hardener Ancamide™ 220-X70 (about 10 g, amine content about 170 mg KOH/g) and the blend is injected into the mold under 3000 psi and allowed to cure to yield a molded part with a density of about 0.73 g/cc.

Example 10

Method for Producing a Low-Density Epoxy Product

A liquid epoxy resin (about 20 g, Dow 335, epoxy equivalent weight about 200) is mixed with about 10 g of glass hollow microspheres functionalized with (6-aminohexyl)-triethoxysilane under vacuum to prevent entrapment of air bubbles. The epoxy resin/microsphere mixture is blended with a polyamide hardener Ancamide™ 220-X70 (about 10 g, amine content about 170 mg KOH/g) and the liquid composite is injected into a mold under 3000 psi and allowed to cure to yield a molded part having a density of about 1.06 g/cc.

Example 11

Method for Producing a Low-Density Polystyrene

Styrene monomer is passed over an ion exchange resin de-inhibitor column to remove any inhibitor. Azobisisobutyronitrile (about 3% w/w) is added to the styrene monomer (about 100 g) and the two are added in a reaction kettle. The system is purged using argon and heated to about 64° C. using a temperature controlled oil bath. The viscosity of the styrene begins to build after about 15 minutes at which time hollow microspheres (about 25 g) functionalized with 3-methacryloxypropyltrimethoxysilane are added and blended into the polymerizing styrene system. The system begins to gel into a solid mass after about 40 minutes at which time samples are removed under argon. The mixture will solidify into a solid mass after about 1 hour, forming a plastic material having a measured density of about 0.85 g/cc.

Example 12

Method for Producing a Low-Density Polystyrene Product

Styrene monomer (about 100 g), azobisisobutyronitrile (about 3% w/w), and hollow microspheres (about 30 g) functionalized with 3-methacryloxypropyltrimethoxysilane are mixed together. Polystyrene (about 10 g, MW 100 kDa) is then added to the mixture as a thickener to help with suspending the hollow microspheres. A mold is heated to about 85° C., evacuated, and the mixture is injected into the mold under 2000 psi. The mold temperature is raised to about 100° C. after 30 minutes and then cooled. After cooling the mold is opened to yield a molded light weight part having a density of about 0.87 g/cc.

Example 13

Method for Producing a Low-Density Epoxy Coating

Liquid epoxy resin (about 20 g, Dow 335, epoxy equivalent weight about 200) is mixed with about 10 g of glass hollow microspheres functionalized with (3-glycidyloxypropyl) trimethoxysilane under vacuum to prevent entrapment of air bubbles. The two components are blended together for about 20 minutes under low shear. The epoxy resin/microsphere mixture is blended with a polyamide hardener Ancamide™ 220-X70 (about 10 g, amine content about 170 mg KOH/g) and the liquid composite is diluted with methylethylketone/xylene (about 2:1) until the system is about 75% solids. The system is spray applied to steel sheets to form a light weight coating having a coating density of about 1.01 g/cc.

Example 14

Method for Producing a Low-Density Acrylate

A bed of methacrylate functional polyethylene spheres (from Example 4) is created using a silicone form. Methyl methacrylate monomer (Aldrich) is passed through an ion exchange column to remove inhibitor. A UV initiator (Darocur 1173, 0.25 wt %) is added to the methyl methacrylate monomer. The monomer is then purged with argon to remove oxygen. Under argon, the monomer is then added to the bed of methacrylate functional polyethylene microspheres until the top layer of spheres is just submerged. The bed of spheres plus monomer is then placed in an argon filled UV cabinet and the sample irradiated (280 nm-400 nm light) for 10 minutes. The solidified brick is removed from the form and the density measured to be 0.69 g/ml.

Any system described above, may be utilized as coatings, castings, pours and the like. In the examples, a general ratio of about 2/3 host material and 1/3 beads by volume is provided. However, as discussed earlier, the density of the products may be reduced further by increasing the bead content. This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases at least one and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases one or more or at least one and indefinite articles such as "a" or an (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. Functionalized hollow microspheres for reducing the density of a structural matrix material, the functionalized hollow microspheres comprising:
    at least one hollow microsphere comprising at least one anchoring group covalently bonded to a surface of the microsphere;
    at least one functional group configured to covalently bond with the structural matrix material; and
    a linking component covalently bonding the at least one anchoring group with the at least one functional group, wherein the linking component is selected from linear, branched, cyclic, substituted, unsubstituted, saturated, and unsaturated $C_1$-$C_{50}$ carbon-based chains, and combinations thereof.

2. The functionalized hollow microspheres of claim 1, wherein the microspheres comprise organic polymers.

3. The functionalized hollow microspheres of claim 1, wherein the microspheres are plastic.

4. The functionalized hollow microspheres of claim 1, wherein the microspheres are selected from the group comprising: ceramic, glass, metal, carbon compositions, metalloids, and combinations thereof.

5. The functionalized hollow microspheres of claim 1, wherein the at least one functional group is chosen from acrylates, methacrylates, ethacrylates, 2-phenyl acrylates, acrylamides, methacrylamides, cyanoacrylates, epoxies, oxetanes, vinyls, vinyl ethers, vinyl esters, vinyl amides, vinyl ketones, styrenes, styryls, isocyanates, uranyls, carboxyls, olefins, allyls, allyl ethers, allyl esters, allyl amines, allyl amides, ethynyls, propargyls, acryloyls, methacryloyls, maleic anhydride, maleic esters, maleimides, itaconates, silanes, siloxanes, silanols, titanates, thiols, phosphazines, titanium oxides, silicones, zirconium oxides, and combinations thereof.

6. The functionalized hollow microspheres of claim 1, wherein the at least one functional group is configured to covalently bond with the structural matrix material selected from the group comprising thermoplastic resins, thermoset resins, inorganic matrices, cementitious matrices, and combinations thereof.

7. The functionalized hollow microspheres of claim 1, wherein the at least one anchoring group is chosen from alcohols; amines; thiols; thiosulphates; carboxylic acids; acid chlorides; esters; acetals; hemiacetals; aminals; hemiaminals; ketones; aldehydes; α-hydroxy ketones; α-halo ketones; epoxides; lactones; thiolactones; azalactones; isocyanate; thiocyanate; imines; succinimides; glutimides; imido esters; aziridines; imidates; oxazine; oxazoline; oxazinium; oxazolinium; chlorotriazines; chloropyrimidines; chloroquinoxalines; chlorobenzotriazoles; sulphonyl halides; siloxanes; silanols; silanes; pyridyldithio derivatives; N-hydroxysuccinimide esters; activated vinyls; nonactivated vinyls; acrylonitriles; acrylic esters; methacrylic esters; crotonic acids; crotonic esters; cinnamic acids; cinnamic esters; styrenes; butadienes; vinyl ethers; vinyl ketones; maleic esters; maleimides; vinyl sulphones; hydrazines; phenyl glyoxal, and combinations thereof.

8. The functionalized hollow microspheres of claim 1, wherein the linking component is selected to enhance dispersion of the microspheres in the structural matrix material.

9. The functionalized hollow microspheres of claim 1, wherein the structural matrix material has a polarity and a hydrogen bonding capacity, and the linking component is selected to have at least one of: a polarity compatible with the polarity of the structural matrix material, and a hydrogen bond with the structural matrix material.

10. The functionalized hollow microspheres of claim 1, wherein:
the microspheres are one of glass microspheres, ceramic microspheres or plastic microspheres; and
the microspheres comprise at least one functional group configured to covalently bond with the structural matrix material selected from the group comprising thermoplastic resins, thermoset resins, inorganic matrices, cementitious matrices, and combinations thereof.

11. The functionalized hollow microspheres of claim 10, wherein:
the at least one functional group is chosen from acrylates, methacrylates, ethacrylates, 2-phenyl acrylates, acrylamides, methacrylamides, cyanoacrylates, epoxies, oxetanes, vinyls, vinyl ethers, vinyl esters, vinyl amides, vinyl ketones, styrenes, styryls, isocyanates, uranyls, carboxyls, olefins, allyls, allyl ethers, allyl esters, allyl amines, allyl amides, ethynyls, propargyls, acryloyls, methacryloyls, maleic anhydride, maleic esters, maleimides, itaconates, silanes, siloxanes, silanols, titanates, thiols, phosphazines, titanium oxides, silicones, zirconium oxides, and combinations thereof; and
the at least one anchoring group is chosen from alcohols; amines; thiols; thiosulphates; carboxylic acids; acid chlorides; esters; acetals; hemiacetals; aminals; hemiaminals; ketones; aldehydes; α-hydroxy ketones; α-halo ketones; epoxides; lactones; thiolactones; azalactones; isocyanate; thiocyanate; imines; succinimides; glutimides; imido esters; aziridines; imidates; oxazine; oxazoline; oxazinium; oxazolinium; chlorotriazines; chloropyrimidines; chloroquinoxalines; chlorobenzotriazoles; sulphonyl halides; siloxanes; silanols; silanes; pyridyldithio derivatives; N-hydroxysuccinimide esters; activated vinyls; nonactivated vinyls; acrylonitriles; acrylic esters; methacrylic esters; crotonic acids; crotonic esters; cinnamic acids; cinnamic esters; styrenes; butadienes; vinyl ethers; vinyl ketones; maleic esters; maleimides; vinyl sulphones; hydrazines; phenyl glyoxal, and combinations thereof.

12. A low-density material comprising functionalized hollow microspheres covalently bonded with a structural matrix material, wherein the functionalized hollow microspheres comprise:
at least one hollow microsphere comprising at least one anchoring group covalently bonded with a surface of the microsphere;
at least one functional group covalently bonded with the structural matrix material; and
a linking component covalently bonding the at least one anchoring group with the at least one functional group, wherein the linking component is selected from linear, branched, cyclic, substituted, unsubstituted, saturated, and unsaturated $C_1$-$C_{50}$ carbon-based chains, and combinations thereof.

13. The low-density material of claim 12, wherein the microspheres are dispersed throughout the structural matrix material.

14. The low-density material of claim 12, wherein the microspheres comprise up to about 80% of the weight of the low-density material.

15. The low-density material of claim 12, wherein the low-density material has a density lower than the structural matrix material.

16. The low-density material of claim 12, wherein the microspheres comprise inorganic solids.

17. The low-density material of claim 12, wherein the microspheres are selected from the group comprising: ceramic, glass, metal, carbon compositions, metalloids, and combinations thereof.

18. The low-density material of claim 12, wherein the structural matrix material is a thermoplastic resin.

19. The low-density material of claim 18, wherein the thermoplastic resin is selected from the group comprising: polyvinyl chloride, polyethylene, polypropylene, polyethylene terephthalate, acrylic, acetal, nylon, polytetrafluoroethylene, urethane, urea, carbonate, sulfone, cyclics, polybutylene terephthalate, other rigid engineering polymers, and combinations thereof.

20. The low-density material of claim 12, wherein the structural matrix material is a thermoset resin.

21. The low-density material of claim 20, wherein the thermoset resin is selected from the group comprising: polyester, vinylester, epoxy, acrylic, phenolic, sulfone, phenyl-formaldehyde, melamine, melamine-formaldehyde, other rigid thermoset engineering polymers, and combinations thereof.

22. The low-density material of claim 12, wherein the structural matrix material is an inorganic matrix.

23. The low-density material of claim 22, wherein the inorganic matrix is selected from the group comprising: ceramic, glass, glass-ceramic, sol-gel compositions, and combinations thereof.

24. The low-density material of claim 12, wherein the structural matrix material is a cementitious matrix.

25. The low-density material of claim 24, wherein the cementitious matrix is selected from the group comprising: portland cement, gypsum, polymer modified cement, latex modified cement, epoxy cements, other cementitious materials commonly used in the manufacture or repair of concrete structure, and combinations thereof.

26. The low-density material of claim 12, wherein the linking component is selected to be dispersible in the structural matrix material.

27. The low-density material of claim 12, wherein the at least one anchoring group is chosen from alcohols; amines; thiols; thiosulphates; carboxylic acids; acid chlorides; esters; acetals; hemiacetals; aminals; hemiaminals; ketones; aldehydes; $\alpha$-hydroxy ketones; $\alpha$-halo ketones; epoxides; lactones; thiolactones; azalactones; isocyanate; thiocyanate; imines; succinimides; glutimides; imido esters; aziridines; imidates; oxazine; oxazoline; oxazinium; oxazolinium; chlorotriazines; chloropyrimidines; chloroquinoxalines; chlorobenzotriazoles; sulphonyl halides; siloxanes; silanols; silanes; pyridyldithio derivatives; N-hydroxysuccinimide esters; activated vinyls; nonactivated vinyls; acrylonitriles; acrylic esters; methacrylic esters; crotonic acids; crotonic esters; cinnamic acids; cinnamic esters; styrenes; butadienes; vinyl ethers; vinyl ketones; maleic esters; maleimides; vinyl sulphones; hydrazines; phenyl glyoxal, and combinations thereof.

28. The low-density material of claim 12, wherein the at least one functional group is chosen from acrylates, methacrylates, ethacrylates, 2-phenyl acrylates, acrylamides, methacrylamides, cyanoacrylates, epoxies, oxetanes, vinyls, vinyl ethers, vinyl esters, vinyl amides, vinyl ketones, styrenes, styryls, isocyanates, uranyls, carboxyls, olefins, allyls, allyl ethers, allyl esters, allyl amines, allyl amides, ethynyls, propargyls, acryloyls, methacryloyls, maleic anhydride, maleic esters, maleimides, itaconates, silanes, siloxanes, silanols, titanates, thiols, phosphazines, titanium oxides, silicones, zirconium oxides, and combinations thereof.

* * * * *

UNITED STATES PATENT AND TRADEMARK OFFICE
CERTIFICATE OF CORRECTION

PATENT NO. : 9,567,255 B2  
APPLICATION NO. : 14/764302  
DATED : February 14, 2017  
INVENTOR(S) : Carlson et al.

Page 1 of 1

It is certified that error appears in the above-identified patent and that said Letters Patent is hereby corrected as shown below:

In the Specification

Column 1, Line 7, delete "§371" and insert -- § 371 --, therefor.

Column 1, Line 8, delete "filed Jan. 31, 2013" and insert -- filed on Jan. 31, 2013 --, therefor.

Column 13, Line 52, delete "phrases at least one and" and insert -- phrases "at least one" and --, therefor.

Column 13, Line 59, delete "phrases one or more or at least one and" and insert -- phrases "one or more" or "at least one" and --, therefor.

Column 13, Line 60, delete "or an (e.g.," and insert -- or "an" (e.g., --, therefor.

Signed and Sealed this  
Twenty-fourth Day of October, 2017

Joseph Matal  
*Performing the Functions and Duties of the*  
*Under Secretary of Commerce for Intellectual Property and*  
*Director of the United States Patent and Trademark Office*